Feb. 27, 1962 P. G. CAMPBELL 3,022,661
AUXILIARY SCALE FOR ULTRASONIC THICKNESS MEASURING MEANS
Filed April 26, 1955
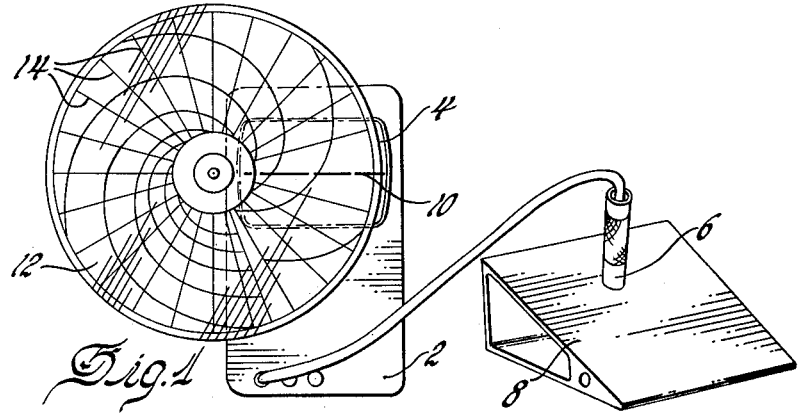
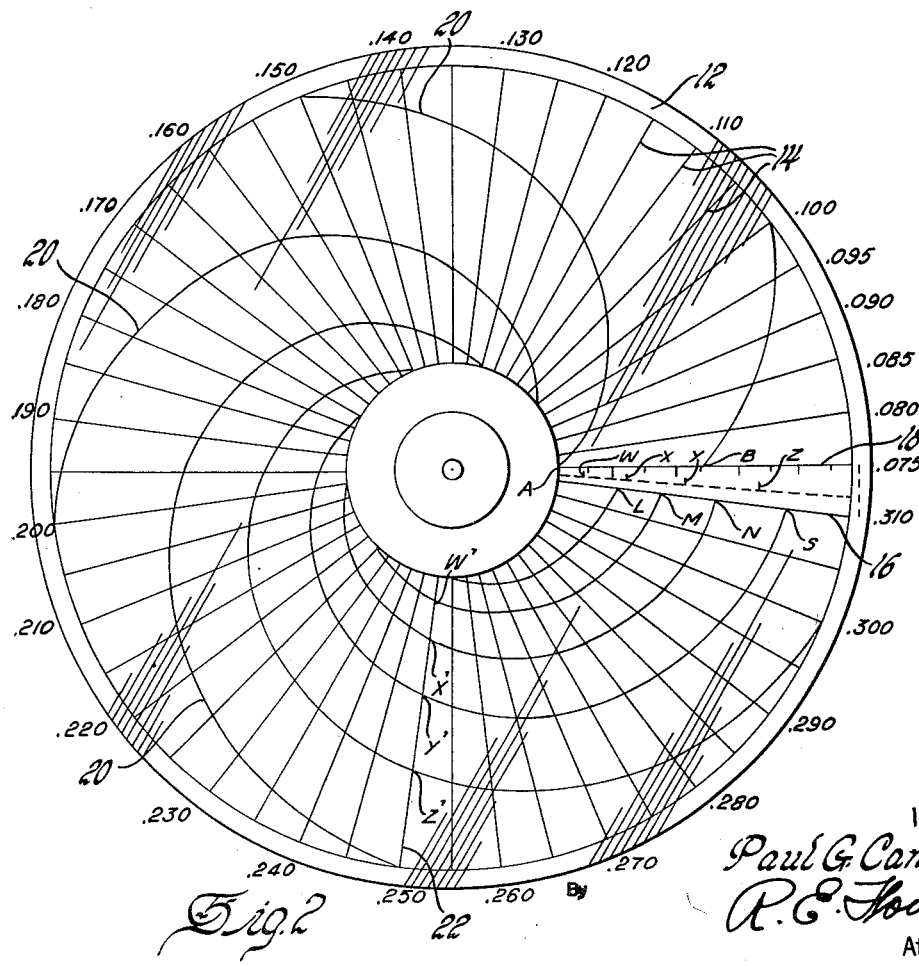
Inventor
Paul G. Campbell
R. E. Fowler
Attorney

# United States Patent Office 3,022,661
Patented Feb. 27, 1962

3,022,661
AN AUXILIARY SCALE FOR ULTRASONIC THICKNESS MEASURING MEANS
Paul G. Campbell, Flint, Mich., assignor to General Motors Corporation, Detroit, Mich., a corporation of Delaware
Filed Apr. 26, 1955, Ser. No. 504,070
3 Claims. (Cl. 73—67.8)

This invention relates to measuring or indicating means and more particularly to an indicating chart which can be applied to the head of an oscilloscope to interpret the developed traces thereon to give desired information.

There are many instances where oscilloscopes are fed signals to derive composite traces indicative of various factors. From these composite traces information is sought and it is necessary to frequently take data from these traces and then mathematically solve to obtain desired answers. As an example of such is the ultra high frequency testing means as shown and described in the patent to Rassweiler and Erwin 2,431,234. Briefly, this means includes an oscillator which is connected to a crystal to drive the same. The crystal is placed in face contact with a surface whose thickness it is desired to ascertain and the oscillator tuned until the crystal causes the part to vibrate at resonant frequency in that area under the crystal. This changes the load on the crystal and the abrupt change in input to the oscillator indicates the resonant condition. The tuning means is continuously driven in this example to cause repetitive scanning of the frequency band of operation.

If the oscillator is connected to an oscilloscope, a pip will appear on the horizontal trace of the oscilloscope at a point representative of the resonant frequency of the part. From a knowledge of the frequency of resonance of the part the thickness can be determined. This would be a relatively simple operation if only one pip appeared on the trace and the operator knew that that represented the fundamental frequency of the part. In actual operation, however, a plurality of pips may appear across the trace which are representative of the fundamental and harmonics or harmonics alone. In order to obtain the thickness, the distances between several of these pips has to be measured and substituted in mathematical formula to determine the thickness. The smaller the frequency spectrum being scanned and the thinner or narrower the frequency band of the crystal being used, the fewer will be the pips and the less the confusion as to which harmonics are represented. However, in order to accommodate as large a range of thicknesses or distances as possible with a given crystal and apparatus, the frequency range is made fairly wide and the crystal of some thickness.

It is an object in making this invention to provide an accessory chart to use with an oscilloscope to interpolate the traces thereon.

It is a further object in making this invention to provide means for quickly and easily obtaining readings from composite oscilloscope traces.

It is a still further object to provide a transparent chart which may be applied to an oscilloscope head to read directly a dimension.

With these and other objects in view which will become apparent as the specification proceeds, my invention will be best understood by reference to the following specification and claims and the illustrations in the accompanying drawings, in which:

FIGURE 1 is a diagrammatic view of testing equipment including a cathode ray oscilloscope with a chart of my invention associated therewith; and FIGURE 2 is a top plan view of a chart embodying my invention.

In FIGURE 1 the cabinet 2 houses the electronic system including the cathode ray tube 4 for ultra high frequency measurements. The transducer or applicator 6 includes the crystal which is in face contact with the surface of the part 8 whose thickness is to be measured. As completly described in the Rassweiler and Erwin patent, the oscillator output drives the transducer crystal and the frequency generated scans a given band. This is synchronized with the horizontal beam deflector of the oscilloscope. If the transducer is not applied to a part then the trace on the cathode ray tube 4 will be a straight horizontal line as shown by the dash line 10. If the transducer is now applied to a part having a thickness within the range of the instrument each time the frequency of resonance of the part is passed a pip will appear on the horizontal trace. This is also true of any harmonics of that frequency falling within the frequency range which will be spaced along the trace.

Since the horizontally spaced pips on the trace represent harmonics, they are mathematically related. Heretofore the distances between pips indicative of frequency differences has had to be measured and by substituting in formula the actual thickness found. By taking a transparent disc 12 and mounting it for rotation in front of the tube and having its axis on one side of the cabinet, radial lines 14 may be brought into coincidence with the horizontal trace of the tube. Each one of the radial lines 14 may indicate a definite thickness within a prescribed range of the instrument. For example in FIGURE 2 the horizontal radius on the right indicates a thickness of .075", as an example, and proceeding around the chart each radial line indicates a larger thickness until the radial line 16 is reached, which in this example is calibrated at .310". This chart therefore is for use with a certain material for a range of thicknesses from .075–.310".

At the smaller thicknesses not as many resonant pips occur within the range of the screen. For example on radial trace 18 point A is one indicating pip and point B another, while progressing around the chart the number of pips increases for each radial line until there are four points L, M, N and S on radial line 16. As thicknesses increase, the resonant frequency, be it a fundamental or harmonic, decreases in proportion and the spiral curves 20 indicate the different spacings within the range. Where these curves 20 cross each radial line 14, a pip will occur for the thickness represented by that line and when any given line is brought into coincidence with the horizontal trace and the pips register with the line intersections, the operator reads that thickness. Thus by rotating the chart 12 until the actual pips present on the horizontal trace each coincides with an intersection of the spiral curves 20 with one of the radial lines 14, then the thickness of the part being tested may be read on the periphery of the disc opposite the end of the radial line.

As an example, assume that there appear on the horizontal trace 10 of the cathode ray tube 4 four pips W, X, Y and Z, spaced as shown on the dotted line between radial lines 16 and 18 of FIGURE 2 to indicate the trace. With that design the operator would turn the chart around until he was able to align these points with the intersections of the spiral curves 20 on any one radial trace. It is found in this instance that the spacing of the pips W, X, Y and Z corresponds with the intersection spacing on radial line 22, as indicated at W', X', Y' and Z'. This indicates that the thickness of the part being tested is .250" as read on the periphery of the chart opposite line 22.

The chart may be prepared by computing the curves or by empirical location of the points from actual testing known dimensions.

I have provided a chart for the rapid and simple reading of ambiguous trace indications to read desired distances.

I claim:
1. In scaling means for use with a measuring instrument of the type having a cathode ray tube and a horizontal trace on which spaced pips are developed by resonances of a part at harmonically related frequencies, a transparent body having a plurality of straight lines thereon, each line representing a different thickness in a progressive order, the differences between lines being of a predetermined magnitude and a plurality of concentric spaced spiral lines representing a mathematical progression intersecting said straight lines, said spiral lines increasing in curvature with increased distance from an initial point and intersecting a larger number of straight lines as the distance from the initial point increases, said intersection points bearing a mathematical relationship representative of locations of harmonically related frequencies, and means for movably mounting said body adjacent the cathode ray tube of the instrument so that the straight lines may be sequentially moved into alignment with the horizontal trace of the cathode ray tube to compare the locations of the pips on the horizontal trace to the locations of the intersections of the spiral lines with a straight line on the transparent body, whereby each straight line when matched so that the intersection points thereon align with said pips represents a given thickness of the part being tested.

2. In indicating scaling means for use with measuring means for determining dimensions of parts by resonances of the part at harmonically related frequencies which develop a horizontal trace on a cathode ray tube having a plurality of spaced pips thereon representative of resonances and the thickness of the part, a transparent circular member having a plurality of spaced radial lines thereon and a plurality of spiral lines of increasing curvature representing a mathematical progression proceeding around the member from an initial point and providing points of intersection between the radial lines and the spiral curves representative of locations of harmonically related frequencies, there being an increasing number of points of intersection in proceeding around the member from said initial point and said points of intersection bearing a mathematical relation to each other, means for rotatably mounting said member about its center adjacent the measuring means so that the radial lines may be brought into alignment with the horizontal trace on the cathode ray tube to compare the spacing of the resonance pips with the spacing of the points of intersection representative of locations of harmonically related frequencies, each radial line representing a given dimension.

3. In scaling means for use with a measuring instrument of the type having a cathode ray tube and a horizontal trace on which spaced pips are developed by resonances of a part being tested at harmonically related frequencies, a transparent body having a plurality of straight lines thereon, each line representing a different thickness in a progressive order, the differences between lines being of a predetermined magnitude and a second plurality of spaced lines intersecting said straight lines, said intersection points bearing a mathematical relationship representative of locations of harmonically related frequencies, said body being movably positioned with respect to the catode ray tube so that the straight lines may be sequentially moved into alignment with the horizontal trace of the cathode ray tube to compare the locations of the pips on the horizontal trace to the locations of intersections of the said second plurality of lines with a straight line on the transparent body, whereby each straight line when matched so that the intersection points thereon align with said pips represents a given thickness of the part being tested.

References Cited in the file of this patent

UNITED STATES PATENTS

| | | |
|---|---|---|
| 1,609,571 | Olson | Dec. 7, 1926 |
| 2,075,854 | Karnes | Apr. 6, 1937 |
| 2,431,234 | Rassweiler et al. | Nov. 18, 1947 |
| 2,446,674 | Sproul | Aug. 10, 1948 |
| 2,524,790 | Grunwald | Oct. 10, 1950 |
| 2,546,510 | Jones | Mar. 27, 1951 |
| 2,586,743 | Thresher et al. | Feb. 19, 1952 |
| 2,636,674 | Levine | Apr. 28, 1953 |